Feb. 1, 1966  D. C. MULLER  3,232,417
CONTINUOUS ACTION DEFLECTOR FOR CONVEYORS
Filed July 27, 1964  6 Sheets-Sheet 1
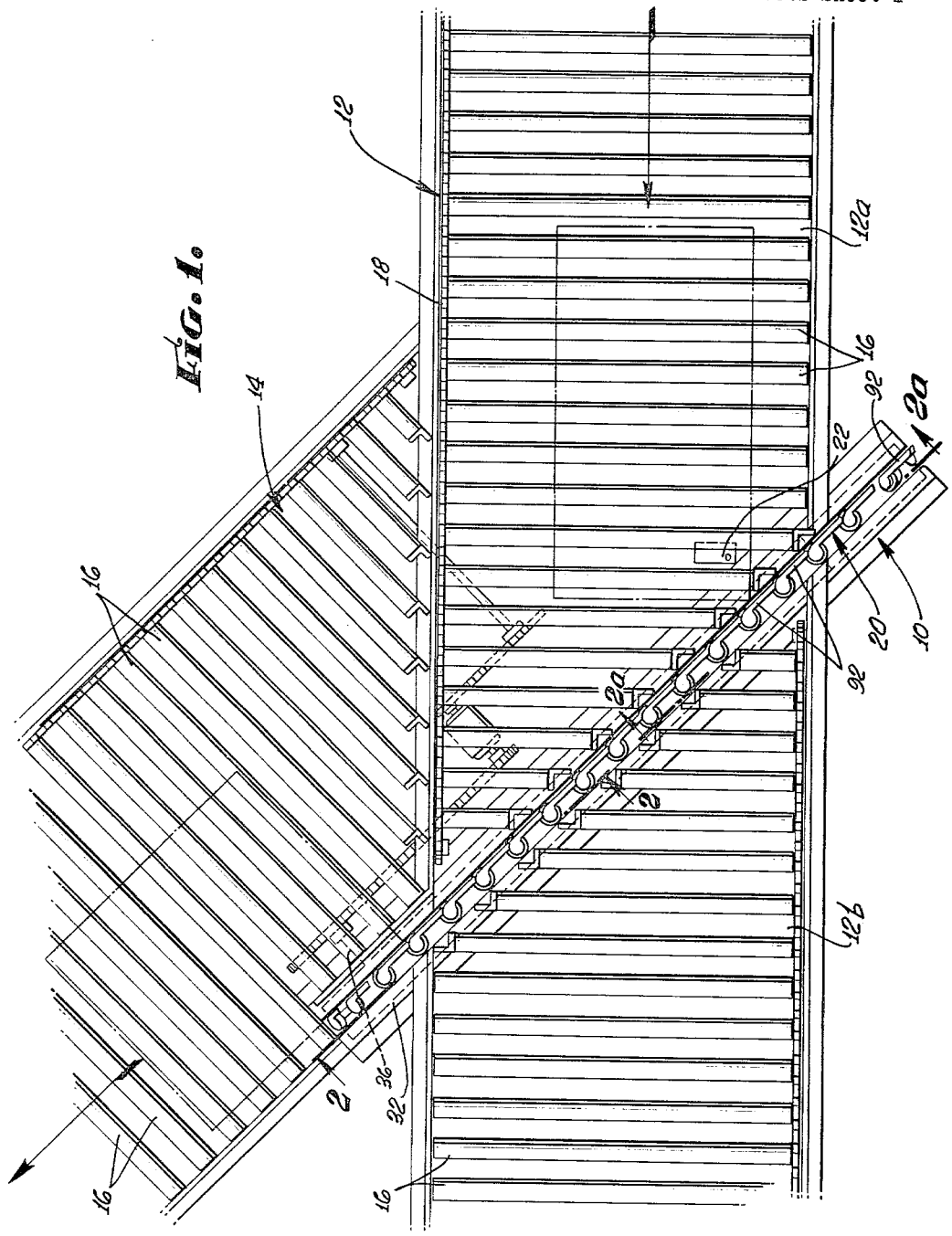
INVENTOR.
DONALD C. MULLER
BY Huebner & Worrel
ATTORNEYS.

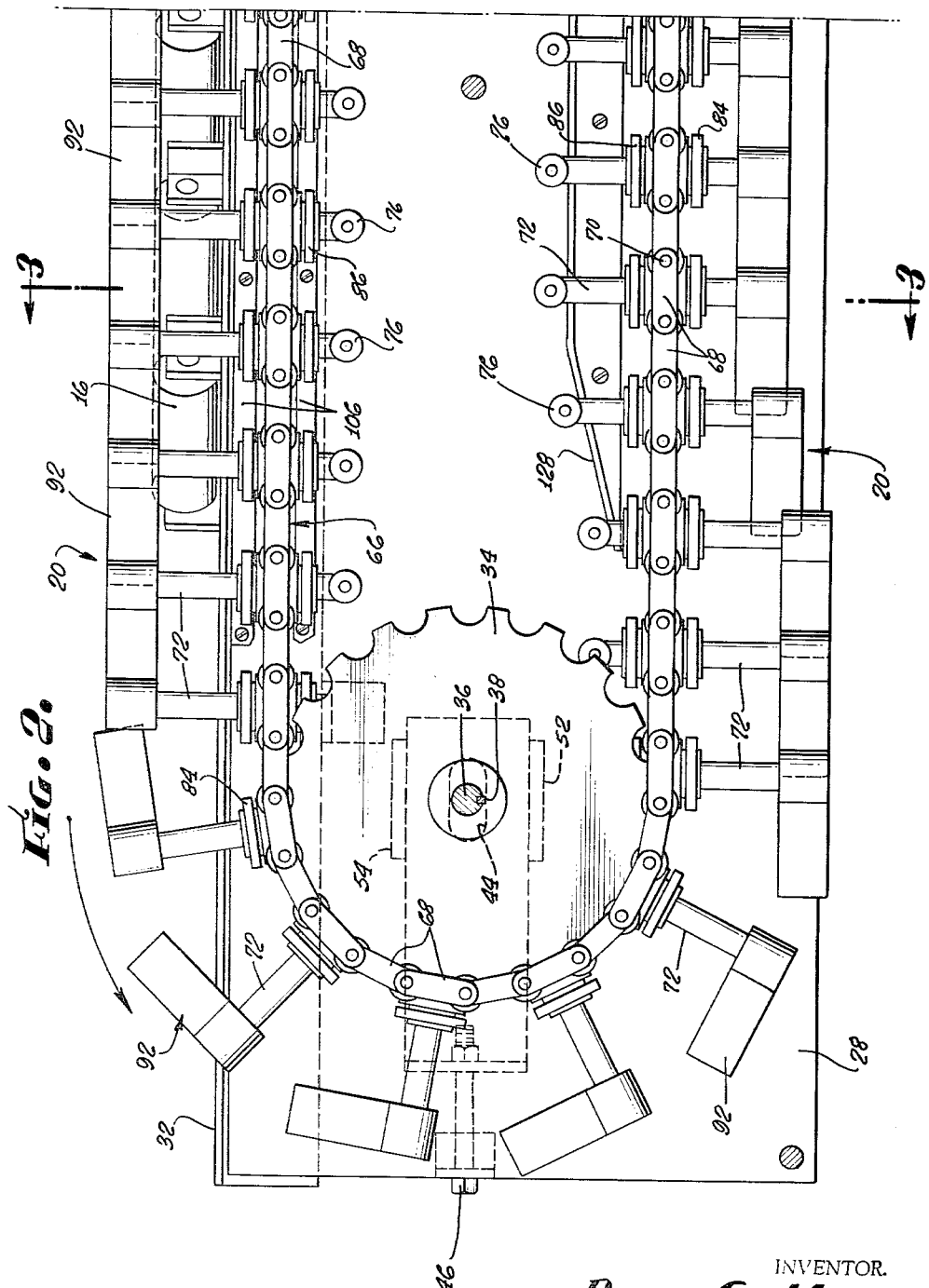

Feb. 1, 1966   D. C. MULLER   3,232,417
CONTINUOUS ACTION DEFLECTOR FOR CONVEYORS
Filed July 27, 1964   6 Sheets-Sheet 3

INVENTOR.
DONALD C. MULLER
BY Huebner & Worrel
ATTORNEYS.

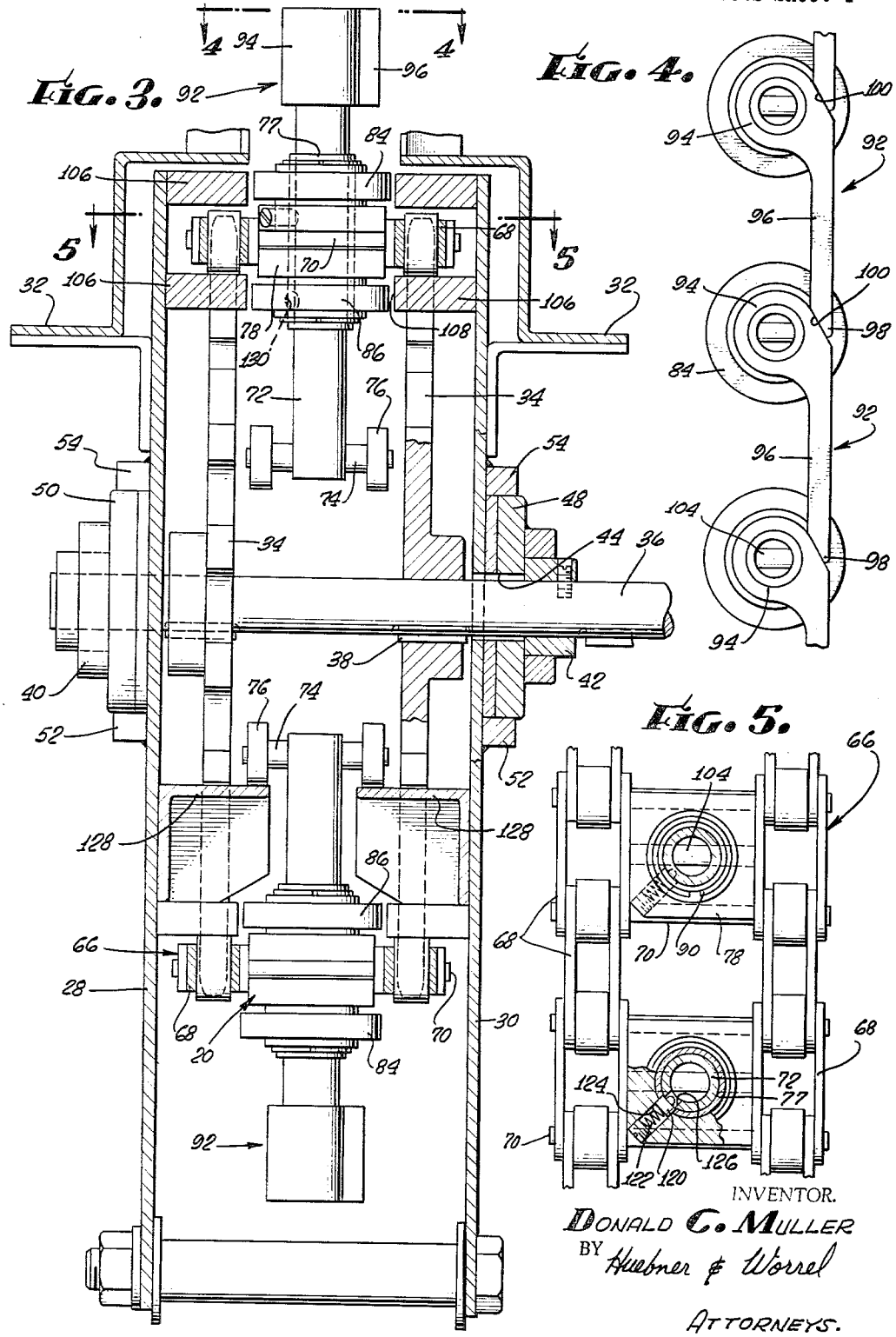

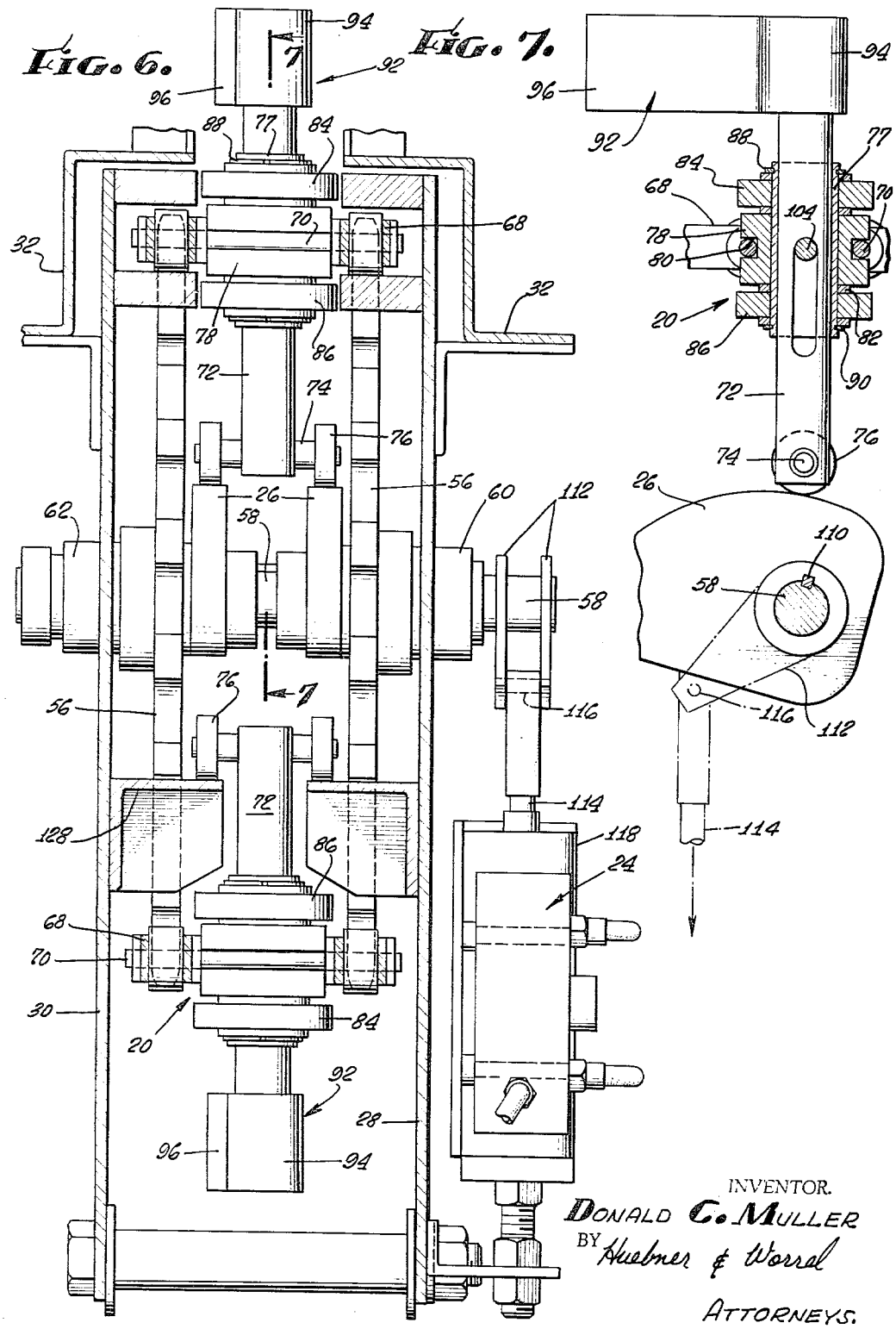

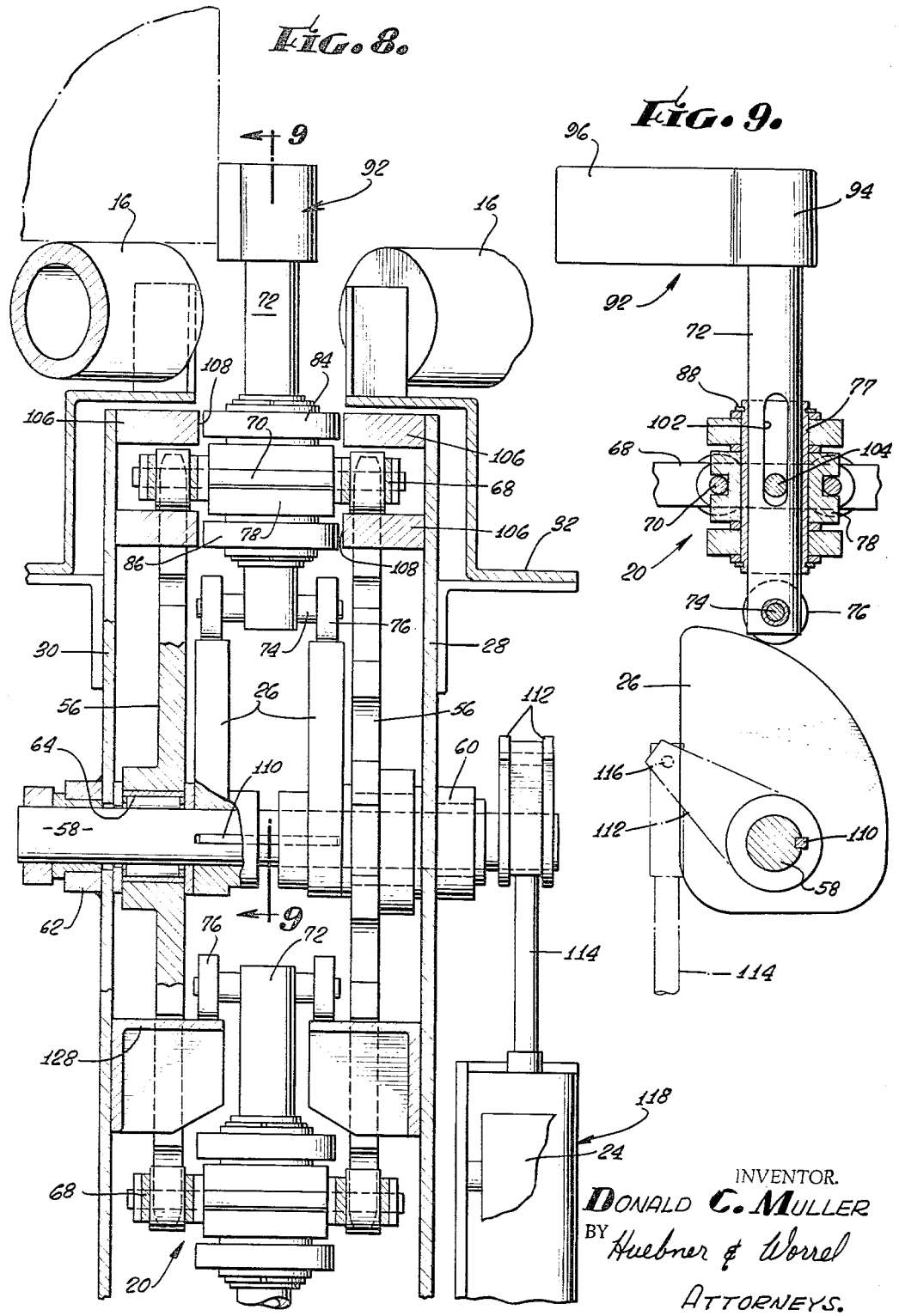

3,232,417
CONTINUOUS ACTION DEFLECTOR FOR CONVEYORS

Donald C. Muller, Whittier, Calif., assignor to C. F. Butz Engineering, Azusa, Calif., a corporation of California
Filed July 27, 1964, Ser. No. 385,414
17 Claims. (Cl. 198—185)

This invention relates to a continuous action deflector means for moving cargo from one conveyor to another conveyor or to an area adjacent a conveyor.

More particularly, this invention comprises a series of flag means which may be extended above a continuous action conveyor to interrupt the line of travel along the conveyor and deflect cargo thereon or to remain in a retracted position to allow cargo to pass over the deflector means along the normal line of travel on the conveyor.

Heretofore, cargo moving along a conveyor means had to be physically removed from the conveyor means and depended upon human energy to physically effect the transfer from one conveyor to another or from one conveyor to a storage area.

The present invention contemplates the removal of cargo from one conveyor to another or from one conveyor to a storage area without the need of physical removal; this is accomplished by a deflecting principle which may be self-regulating or controlled by an operator.

An object of this invention is to provide a deflecting means which will continually rotate and may be brought into engaging use upon any desired type of electrical or mechanical signal.

A further object of this invention is to provide a continuous action deflector means employing a plurality of flag means mounted on an endless chain whereby the flag means are normally retracted but may be extended by activation of a pivotally mounted cam means.

Another object of this invention is to provide camming means for the retraction of the flag means when the flag means have been moved to an extended position.

Another object of this invention is to provide a flag means which includes deflector arms integral with each other forming a substantially uninterrupted barricade for the interception of cargo along a conveyor system whereby the cargo may be intercepted and deflected angularly with regard to the line of travel of the cargo of the conveyor.

A further object of this invention is to provide a flag means which is located obliquely to the line of travel of a conveyor wherein it is mounted.

Another object of this invention is to provide locking means for releasably retaining the respective flag means in retracted or extended positions.

These and other objects of the invention will be made more fully apparent from a consideration of the description which follows taken in conjunction with the drawings.

In the drawings:

FIGURE 1 is a top elevational view of the continuous action deflector means mounted in an environment of conveyors;

FIGURE 2 is a side elevational view of one half of the deflector means taken on line 2—2 of FIGURE 1;

FIGURE 3 is a cross sectional view of the deflector means taken on line 3—3 of FIGURE 2;

FIGURE 4 is a top elevational view taken on line 4—4 of FIGURE 3 showing the flag means;

FIGURE 5 is a cross sectional view taken on line 5—5 of FIGURE 3 illustrating details of the flag means partly in section;

FIGURE 6 is a cross sectional view of the deflector means taken on line 6—6 of FIGURE 2a illustrating the positioning of respective parts;

FIGURE 7 is a cross sectional view of the flag means and its cooperation with the cam means taken on line 7—7 of FIGURE 6 showing the flag means in a retracted position;

FIGURE 8 is a view similar to FIGURE 6 illustrating the flag means in extended position; and FIGURE 9 is a view similar to FIGURE 7 taken on line 9—9 of FIGURE 8 illustrating the flag means in an extended position.

Figure 2A:
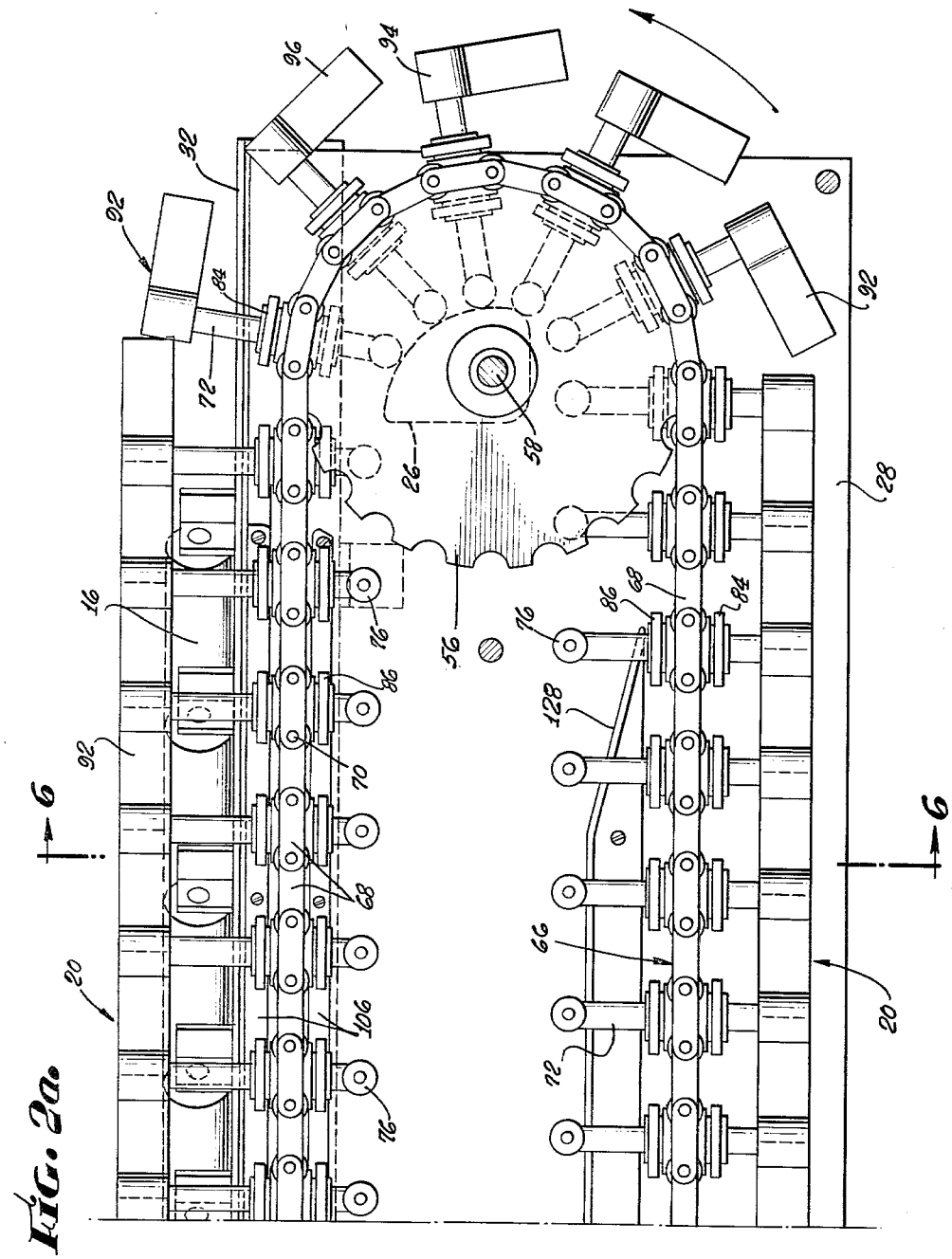
FIGURE 2a is a side elevational view on the other half of the deflector means taken on line 2a—2a of FIGURE 1.

This invention relates to a continuous action deflector means generally designated 10 which is usually positioned obliquely within the path of travel of a master conveyor generally designated 12 including spaced apart first and second sections 12a and 12b. The continuous action deflector means 10 is utilized to deflect cargo from the line of travel of the cargo on the first section 12a of the master conveyor 12 to a subsidiary conveyor generally designated 14.

The conveyors 12 and 14 can be of any of the commercially available roller driven types of conveyors. For purposes of illustration, the conveyors 12 and 14 include a plurality of rollers 16 which are driven by means of drive chains 18 which are connected to power sources not illustrated.

While the preferred embodiment illustrates a roller driven conveyor, it should be realized that any conveyor such as a belt conveyor possessing a cargo receiving surface may be utilized with this invention.

The deflector means 10 includes a plurality of contiguous flag means generally designated 20. These flag means are capable of assuming a retracted position such as is illustrated in FIGURE 7 where they are beneath the rollers 16 so as not to interfere with the line of travel of cargo along the first and second sections 12a and 12b of the conveyor 12, but are capable of being raised to an extended position such as illustrated in FIGURES 2, 2a, 3, 8 and 9 where they will be above the rollers 16 and deflect cargo to the subsidiary conveyor 14. The raising and lowering of the flag means may be controlled manually by an operator or may be automatically controlled by such things as pressure-sensitive switches or other electrical or mechanical means. One such device is schematically illustrated in FIGURE 1 and is a limit switch 22. This limit switch illustrated in phantom lines in FIGURE 1 may be activated by depressing a roller by the weight of cargo and will in turn activate an air piston means 24, best seen in FIGURES 6 and 8, which in turn will move a cam member 26 from an inoperative position such as illustrated in FIGURE 7 to an operative position such as is shown in FIGURE 9. This in turn will cause flag means to raise and form a barrier. As the cargo passes over the switch 22, the parts become deactivated and the flag means are retracted. Thus a barrier of flag means will always correspond in length to the length of the cargo to be deflected.

Such construction allows a greater volume of goods to be moved because the individual pieces of cargo may be closer together on the master conveyor.

The continuous action deflector means 10 includes a pair of spaced apart side plates 28 and 30 which are secured to the frame 32 of the master conveyor 12 between the first and second sections 12a and 12b. The plates 28 and 30 extend obliquely across and under the rollers 16 of the master conveyor 12 and under a portion of the frame of conveyor 14.

Mounted within the plates 28 and 30 in the area under the subsidiary conveyor 12 are a pair of spaced apart drive sprocket wheels 34. These drive sprocket wheels are fixedly mounted upon a drive shaft 36 by means of key 38. The drive shaft extends through the plates 28 and 30 and is mounted in bearings 40 and 42. As will be seen in FIGURE 1, the shaft 36 extends outwardly under the subsidiary conveyor 14 and terminates in a gear which in turn by a series of gears is associated with an electrical motor all shown in phantom lines. By this means, the drive sprocket wheels 34 may be rotated. In order to properly tension the sprocket wheels 34, the shaft 36 may be moved back and forth within an elongated slot 44 of brackets 48 and 50 which may be horizontally slid between support bars 52 and 54 mounted on plates 28 and 30. To effect the sliding tension a bolt 46 may be adjusted to move the brackets 48 and 50.

At the other end of the plates 28 and 30 and mounted therebetween under master conveyor 12 is a pair of spaced apart idler sprocket wheels 56. These sprocket wheels 56 are freely rotatably mounted upon a shaft 58 which extends through the plates 28 and 30 and is journaled therein in bearings 60 and 62. The shaft 58 may be pivoted 90° from a position as illustrated in FIGURE 6 to a position as illustrated in FIGURE 8. The sprocket wheels 56 include bearing means 64, as best seen in FIGURE 8, to achieve free rotation on the shaft 58. A pair of endless chains 66 extend around each of the pairs of sprocket wheels 34 and 56 as best seen in FIGURES 2 and 2a. These endless sprocket chains 66 each include a plurality of links 68 joined by pivot pins 70. Mounted between the pairs of the links 68 are the flag means 20.

These flag means each include an elongated telescoping tube 72 with a shaft 74 extending through and beyond the tube at one end thereof, best seen in FIGURES 3, 6 and 8, and mounted on the shaft 74 are a pair of cam followers 76. Each of the telescoping tubes 72 are mounted on a sleeve 77 within a flag block 78 which is retained between the links 68 by means of the pivot pins 70 passing through recesses 80 formed at either side of the block 78. Above and below the block 78, washers 82 are positioned and a pair of guide wheels or torque bearing wheels 84 and 86 are also positioned on the sleeve 77. In order to retain the assembly together, a retaining ring 88 is secured at the top of the sleeve 77 and a retaining ring 90 is secured at the bottom of the sleeve 77. At the end of the telescoping tube 72 remote from the cam follower 76, a flag or deflecting arm 92 is provided. Each of the respective arms 92 include a body portion 94 which is secured to the tube 72 and a finger extension 96 extending normal to the axis of the telescoping tube 72. Each of the fingers at ends 98 are beveled at 100 as best illustrated in FIGURE 4. The spacing of the respective arms 92 is such that when they are in an upper horizontal position, the beveled edge 100 abuts against the body portion 94 of the next flag arm 92 to form a contiguous solid barrier, such as illustrated in FIGURE 4.

The tube 72 is provided with an elongated axially arranged slot 102 and mounted within the slot between the sides of the block 78 is a guide pin 104.

Secured on the side of the plates 28 and 30 adjacent the upper end thereof are a pair of spaced apart rails 106 which extend inwardly toward each other from the respective plates 28 and 30. These pairs of rails 106 provide end faces 108 against which the wheels 84 and 86 may ride. The rails 106 extend across the top of the assembly such as is illustrated in FIGURES 2 and 2a. The guide wheels 84 and 86 and the rails 106 will prevent misalignment of the deflecting arms 92 when the arms are in an extended position.

As will be seen from FIGURES 7 and 9, the deflection arms 92 will assume one of two positions. They will either be in a retracted position such as is shown in FIGURE 7 or in an extended position as in FIGURE 9.

In order to accomplish the vertical movement of the arms 92, the cams 26 are provided. These cams are fixedly mounted to the shaft 58 by means of a key 110. In order to move the cams from an inoperative position as shown in FIGURE 7 to an operative position as illustrated in FIGURE 9, a pair of link arms 112 are secured to the shaft 58 as best seen in FIGURE 6 and FIGURE 8. These link arms 112 extend to a piston rod 114 and are linked thereto for pivotal movement by means of a pin 116. The piston arm 114 extends from an air cylinder 118 which may be activated by electrical or mechanical means, not shown, to force the piston rod upward such as shown in FIGURE 8 or to retract it such as illustrated in FIGURE 6. As the link arms 112 move upward, the shaft 58 is pivoted 90° which in turn will raise the cam 26 where it will be engaged by the follower 76 on the arm 92 and will telescope the tube 72 upward within the block to a position illustrated in FIGURES 8 and 9. In this position, it will be seen that the deflector arms 92 are above the rollers 16 and will deflect cargo as it moves along the line of travel on the master conveyor 12.

Once the tube 72 and arms 92 have been raised to the extended position shown in FIGURE 9 along the leading side of the chain, that is the side at the top as viewed in FIGURES 2 and 2a, a locking means 120 will maintain the tube 72 in its elevated position. The locking means best illustrated in FIGURES 3 and 5, include a spring loaded detent 122 which is fitted within a bore 124 of the flag block 78. This spring loaded detent 122 is urged outwardly against the tube 72 and will seat in a notch 126 formed in the tube.

There is provided adjacent the following side of the chain 66, that is the lower part of the assembly, a pair of cam ramps 128 which are secured to the inner surface of the plates 28 and 30. These ramps 128 are engaged by the cam followers 76 of the flag means 20 to retract the deflector arms 92 such as illustrated in FIGURE 2. As the cam followers 78 engage the beginning of the ramp, the spring loaded detent 122 is disengaged from the recess 126 and the tube 72 is allowed to move upwardly in the block 78 to a position illustrated in FIGURES 2 and 2a along the following side of the chain 66.

The tube 72 and deflector arms 92 will remain in the retracted position because the spring loaded detent 122 will engage another recess 130 best seen in FIGURE 3. As the individual flag means 20 are moved around the sprocket wheel 56, they may be retained in the retracted position unless the cams 26 are elevated to a position illustrated in FIGURE 9, in which case the cam followers will engage the cam disengaging the detent from the recess 130 and urge the arms 92 upward to a position where they may intercept a cargo above the rollers 16. The flag means in such position will remain in this position until they again completely move around the drive wheel 34 and engage the cam ramps 128.

In operation, the drive sprocket wheels 34 are continually rotated through the shaft 56 by any well-known motor means such as an electric motor. This in turn will rotate the single link chains 66 continually around the sprocket wheel 34 and idler sprocket wheel 56. The respective flag means 20 will remain in a retracted position such as illustrated in FIGURES 6 and 7 as they endlessly revolve around the sprocket wheels. When it is desired to deflect cargo from the master conveyor 14, the air cylinder 118 is activated by an operator at a visual control point or the air cylinder may be activated through a limit switch or pressure sensitive switch 22 and cargo will be deflected depending upon the weight that passes over the limit switch 22. This will activate the piston 114 and urge it upwardly and the link arms 122 will pivot the shaft 58 a quarter of a turn. The cams 26 will then be elevated to a position where they are engageable by the cam followers 76 raising the flag arms 92 to an extended position from a position adjacent the cams 26 around the leading side of the chain 66 around the drive sprocket wheels 34 to the cam ramp 128 at which time they will be retracted and the cycle repeated.

If the chain 66 is run at a speed equal to the speed of master conveyor 12, it will be seen that the last flag means activated by a piece of cargo will arrive at the cargo as it is deflected from the master conveyor. In other words, the piece of cargo is moved by deflection and by the barrier moving in the same direction as the deflection. In this way, it will be seen that the barriers may vary in length and will complete their function as the last flag to raise comes to the end of the leading side of chain 66 before it swings around the sprocket wheel 34.

Thus it is possible that more than one barrier surface will be presented on the leading side of chain 66 across the width of the master conveyor 12. Some of the barrier surfaces can be as small as one of the flag means 22 or others can include contiguous flag means 22 across the entire surface of master conveyor 12.

While the instant invention has been shown and described herein in what is conceived to be the most practical and preferred embodiments, it is recognized that departures may be made therefrom within the scope of the invention which is therefore not to be limited to the details disclosed herein but is to be accorded the full scope of the claims so as to embrace any and all equivalent devices.

I claim:

1. A cargo deflector mechanism for use with and interposed between a first and second section of a conveyor which includes a cargo receiving surface, said conveyor sections having the same line of travel comprising a frame mounted between said sections of said conveyor, a drive wheel and an idler wheel mounted on said frame for rotation obliquely to the line of travel of said conveyor, an endless belt means mounted on said drive and said idler wheels including a leading side and following side, power means to rotate said drive wheel, deflector means telescopingly mounted on said endless belt means normally reposing in a retracted position below said cargo receiving surface, first cam means associated with said frame and movable from an inoperative to an operative position, said deflector means engageable by said cam means whereby when said cam means are moved to an operative position said deflector means will be urged outwardly of said endless belt to an extended position above said cargo receiving surface when said deflector means are moved to said leading side of said belt and will intercept cargo moving along said line of travel and deflect said cargo from said conveyor, means to activate said cam means, and second camming means in the region of said following side of said endless belt engageable by said deflector means to move said deflector means to said normally retracted position.

2. A cargo deflector mechanism as defined in claim 1 wherein said deflector means includes a plurality of flags which form a contiguous barrier above said cargo receiving surface when said deflector means is moved to the extended position.

3. A cargo deflector mechanism as defined in claim 1 including an air actuated piston operably connected to said first cam means to move said first cam means from said inoperative to said operative position.

4. A cargo deflector mechanism as defined in claim 1 wherein said endless belt means is a sprocket chain and said deflector means includes a plurality of blocks mounted along said chain.

5. A cargo deflector mechanism as defined in claim 4 wherein said deflector means each includes a telescoping tube mounted within said block having an end terminating in a cam follower adapted to be engaged by said first cam means when said cam means is moved to said operative position.

6. A cargo deflector mechanism as defined in claim 1 wherein said deflector means includes releasable holding means for maintaining said deflector means in said retracted position and in said extended position.

7. A cargo deflector mechanism for use with and interposed between a first and second section of a conveyor which includes a cargo receiving surface, said conveyor sections having the same line of travel comprising a frame mounted between said sections of said conveyor, a drive wheel and an idler wheel mounted on said frame for rotation obliquely to the line of travel of said conveyor, an endless link chain mounted on said drive and said idler wheels including a leading side and following side, power means to rotate said drive wheel, a plurality of flag means telescopingly mounted on said endless link chain normally reposing in a retracted position below said cargo receiving surface, first cam means associated with said frame and movable from an inoperative to an operative position, said flag means engageable by said cam means whereby when said cam means are moved to an operative position said flag means will be urged outwardly of said endless belt to an extended position above said cargo receiving surface when said flag means are moved to said leading side of said belt and forming a contiguous barrier to intercept cargo moving along said line of travel and deflect said cargo from said conveyor, means to activate said cam means, and second camming means in the region of said following side of said chain engageable by said flag means to move said flag means to said normally retracted position, and said flag means including releasable holding means for maintaining said flag means in said retracted position and in said extended position.

8. A cargo deflector means as defined in claim 7 wherein said releasable holding means are spring loaded detents.

9. A cargo deflector means as defined in claim 7 wherein said second camming means is a ramp upon which said flag means rides to said retracted position as said chain moves around said drive and said idler wheels.

10. The combination of: a power driven master roller conveyor including a cargo receiving surface, said master conveyor including a first and second section having the same line of travel, a void formed between said first and second sections, said void being obliquely arranged relative to said line of travel of said master conveyor, a second power driven conveyor abutting said first section of said master conveyor and extending obliquely to said line of travel of said master conveyor corresponding to the angle of inclination of said void, a frame mounted between said sections of said conveyor within said void, a drive wheel and an idler wheel mounted on said frame for rotation obliquely to the line of travel of said master conveyor, an endless sprocket chain mounted on said drive and said idler wheels including a leading upper side and following lower side, power means to rotate said drive wheel, deflector means telescopingly mounted on said endless sprocket chain normally reposing in a retracted position below said cargo receiving surface as said chain rotates, first cam means associated with said frame and movable from an inoperative to an operative position, said deflector means engageable by said cam means whereby when said cam means are moved to an operative position said deflector means will be urged outwardly of said endless belt to an extended position through said void above said cargo receiving surface when said deflector means are moved to said leading side of said belt so that said deflector means will intercept cargo moving along said line of travel on said first section of said master conveyor and deflect said cargo from said master conveyor on to said second conveyor, means to activate said first cam means, and stationary camming means in the region of said following side of said endless sprocket chain engageable by said deflector means to move said deflector means to said normally retracted position.

11. The combination as defined in claim 10 wherein said means to activate said first cam means includes an air actuated piston linked to said cam means, and a switch means to actuate said piston.

12. The combination as defined in claim 11 wherein said switch means includes a pressure sensitive switch engageable by cargo moving on said first section of said master conveyor.

13. Cargo deflecting means adapted for use with and interposed within a power driven conveyor, comprising a drive wheel and an idler wheel spaced therefrom and below said conveyor and each mounted for rotation obliquely to the line of travel of said conveyor, an endless sprocket chain mounted on said drive and said idler wheels, a plurality of spaced apart flag means telescopingly mounted on said chain, drive means connected to said drive wheel whereby said sprocket chain and flag means will move around said wheels obliquely to said line of travel, said flag means being selectively movable from a normally retracted position to an extended position whereby said flag means in said extended position will rise above said conveyor to intercept and deflect cargo moving on said conveyor, but when said flag means are in said retracted position, they will remain below said conveyor to allow cargo to move uninterrupted along the conveyor.

14. Cargo deflecting means as defined in claim 13 wherein said flag means are selectively movable by cam means.

15. Cargo deflecting means as defined in claim 14 wherein said cam means includes a stationary cam means to retract said flag means and a rotatable cam means adapted to engage said flag means and urge said flag means to an extended position.

16. Cargo deflecting means as defined in claim 13 wherein said flag means each include projections which contact an adjacent flag means forming a solid barrier during certain positions of the revolution of said chain.

17. Cargo deflecting means as defined in claim 13 wherein said flag means include releasable holding means for retaining said flag means in said retracted and said extended positions.

References Cited by the Examiner
UNITED STATES PATENTS

| | | | |
|---|---|---|---|
| 1,904,837 | 4/1933 | Posey | 198—38 |
| 3,191,747 | 6/1965 | Pollard | 198—185 X |

HUGO O. SCHULZ, *Primary Examiner.*

SAMUEL F. COLEMAN, R. E. KRISHER,
*Assistant Examiners.*